United States Patent
Andersson et al.

(10) Patent No.: US 11,649,146 B2
(45) Date of Patent: May 16, 2023

(54) SAFETY SYSTEM

(71) Applicant: Hiab AB, Kista (SE)

(72) Inventors: Lennart Andersson, Hudiksvall (SE);
Björn Nilsson, Malmö (SE); Bengt Söderholm, Hudiksvall (SE); Marcel Boxem, Ruinerwold (NE); Johan Westerberg, Genarp (SE); Jan A Vink, Havelte (NE); Kalevi Nurmi, Kaarina (FI)

(73) Assignee: Hiab AB, Kista (SE)

( * ) Notice: Subject to any disclaimer, the term of this patent is extended or adjusted under 35 U.S.C. 154(b) by 1061 days.

(21) Appl. No.: 16/386,549

(22) Filed: Apr. 17, 2019

(65) Prior Publication Data
US 2019/0322498 A1 Oct. 24, 2019

(30) Foreign Application Priority Data
Apr. 20, 2018 (EP) .................................... 18168520

(51) Int. Cl.
*B66C 23/90* (2006.01)
*B60P 1/54* (2006.01)
(Continued)

(52) U.S. Cl.
CPC .............. *B66C 23/905* (2013.01); *B60P 1/54* (2013.01); *B66C 13/40* (2013.01); *B66C 15/045* (2013.01); *B66C 2700/082* (2013.01)

(58) Field of Classification Search
CPC ................................. E02F 9/205; B66C 13/40
See application file for complete search history.

(56) References Cited

U.S. PATENT DOCUMENTS

| 4,833,615 A | 5/1989 | Bitner et al. |
| 5,490,081 A | 2/1996 | Kuromoto et al. |

(Continued)

FOREIGN PATENT DOCUMENTS

| CN | 104098032 A | 10/2014 |
| DE | 43 31 776 A1 | 3/1995 |

(Continued)

OTHER PUBLICATIONS

Extended European Search Report for corresponding European Patent Application No. 18168520.7 dated Oct. 25, 2018.

*Primary Examiner* — Timothy R Waggoner
(74) *Attorney, Agent, or Firm* — Renner, Otto, Boisselle & Sklar, LLP

(57) ABSTRACT

A safety system (2) for a working vehicle (4) comprising a working equipment (6), e.g. a crane or a working tool, the safety system (2) comprises a control unit (8), a controller (10), e.g. a remote controller, configured to control said working equipment (6), and a display unit (12). The control unit is configured to:
define a set of three-dimensional safety spaces (14) in relation to the vehicle (4),
present at least one safety space (14) from said set of safety spaces on said display unit (12), wherein said at least one safety space being presented overlaid on an image (18) of at least a part of the working vehicle (4) and working equipment (6),
receive a first input signal (20) comprising space position parameters representing at least one chosen safety space among the presented safety spaces, and to designate each at least one chosen safety space as an active safety space (14A), and to
receive a second input signal (22) comprising a safety space state command either allowing or preventing said working equipment to be moved into said at least one
(Continued)

active safety space (14A), and to apply a state command signal (24) to said controller (10) to control said working equipment (6) in dependence of said safety space state command.

13 Claims, 3 Drawing Sheets

(51) Int. Cl.
*B66C 13/40* (2006.01)
*B66C 15/04* (2006.01)

(56) References Cited

U.S. PATENT DOCUMENTS

| | | | |
|---|---|---|---|
| 5,746,261 A * | 5/1998 | Bowling | A01G 23/067 |
| | | | 144/334 |
| 9,238,570 B2 * | 1/2016 | Schoonmaker | B66C 13/46 |
| 9,269,255 B2 | 2/2016 | Beaulieu et al. | |
| 10,404,327 B2 * | 9/2019 | Inaba | B25J 9/1676 |
| 2006/0271263 A1 * | 11/2006 | Self | G05D 1/0033 |
| | | | 701/2 |
| 2012/0308354 A1 | 12/2012 | Tafazoli Bilandi et al. | |
| 2015/0161872 A1 * | 6/2015 | Beaulieu | B66C 13/40 |
| | | | 340/686.6 |

FOREIGN PATENT DOCUMENTS

| | | |
|---|---|---|
| EP | 2 323 943 A1 | 5/2011 |
| WO | 92/20608 A1 | 11/1992 |
| WO | 2013/006625 A2 | 1/2013 |
| WO | 2013/007329 | 1/2013 |

* cited by examiner

SAFETY SYSTEM

This application claims priority to European Patent Application No. 18168520.7 filed on Apr. 20, 2018, which is hereby incorporated herein by reference.

TECHNICAL FIELD

The present disclosure relates to a safety system for a vehicle provided with a working equipment, e.g. a crane, and in particular a safety system where various safety spaces in relation to the vehicle are presented to a user on a display unit. The disclosure also relates to a method in relation to a safety system.

BACKGROUND

A working equipment for a working vehicle may comprise a crane often provided with extendible arms and normally having a working tool arranged at a crane tip. An operator of the working equipment normally controls e.g. the crane via a remote controller. When performing loading and unloading procedures with the crane high demands are required on the operator in order to safely load or unload a load taking into account various environmental obstacles, e.g. overhead electric cables, bridges, buildings, etc.

In the following patent documents some different ways of handling these procedures are described.

EP2323943 discloses a safety system for a vehicle provided with stabilizer legs which are controlled by means of a remote control unit. Two transmitting units are arranged on each stabilizer leg in order to communicate with a receiving unit provided on the remote control unit. The transmitting ranges of the transmitting units are different to thereby enable the transmitting units to define an inner zone boundary and an outer zone boundary. The remote control unit is only allowed to control the movement of a stabilizer leg when it is established, based on the signals received from the transmitting units, that the remote control unit is located in the region between the inner zone boundary and the outer zone boundary.

U.S. Pat. No. 9,269,255 discloses a worksite proximity warning system. Personnel or objects at the worksite may be equipped with transceivers and a virtual safety envelop is created around each transceiver. When two of the virtual safety envelopes enters in contact with each other, warnings or alarms may warn the personnel of potential hazards.

WO 2013/007329 discloses a remote control system for controlling a self-propelled implement, wherein a remote control unit is provided with means for sending an electromagnetic safety signal with a limited transmitting range. The electromagnetic safety signal defines a safety area around the remote control unit and the movement of the self-propelled implement is stopped when a receiver on the self-propelled implement receives the electromagnetic safety signal.

U.S. Pat. No. 5,490,081 discloses a system for limiting the operation range of a working tool of a working machine, such as for instance a hydraulic excavator, wherein the operator may set the boundary of a safety region in order to prevent the working tool from interfering with the operator's station.

U.S. Pat. No. 4,833,615 discloses a system for defining boundaries for the allowable working area of a crane, wherein the crane is moved by the crane operator to positions corresponding to the desired boundaries and these positions are recorded in order to define the boundaries.

DE 4331776 discloses a system where the allowable working area of a crane is defined by different boundary lines. However, it is not described how the positions for these boundary lines are set.

CN 104098032 discloses a system where an operator of a crane may input numerical values in order to define desired boundaries for an allowable working area of the crane.

The above patent documents show that many different safety solutions exist intended to provide and monitor safety zones for operators of e.g. a crane. However, there are still room for further improvements in order to further improve the safety and also to improve the user-friendliness when working in relation to working vehicles provided with a working equipment, e.g. a crane.

Thus, the object of the present invention is to achieve an improved safety system that meets high safety requirements and at the same time being user-friendly and easy to use.

SUMMARY

The above-mentioned object is achieved by the present invention according to the independent claims.

Preferred embodiments are set forth in the dependent claims.

According to a first aspect the present invention relates to a safety system for a working vehicle comprising a working equipment, e.g. a crane or a working tool, the safety system comprises a control unit, a controller, e.g. a remote controller, configured to control said working equipment, and a display unit.

The control unit is configured to:
  define a set of three-dimensional safety spaces in relation to the vehicle, wherein each safety space is defined by a data representation of boundaries of the safety space,
  present at least one safety space from said set of safety spaces on said display unit, wherein said at least one safety space being presented overlaid on an image of at least a part of the working vehicle and working equipment, and wherein each presented safety space being presented in a predefined position, defined by space position parameters, in relation to the working vehicle and working equipment,
  receive a first input signal comprising space position parameters representing at least one chosen safety space among the presented safety spaces, and to designate each at least one chosen safety space as an active safety space, and to
  receive a second input signal comprising a safety space state command either allowing or preventing said working equipment to be moved into said at least one active safety space, and to apply a state command signal to said controller that in turn is configured to control said working equipment in dependence of said safety space state command.

According to a second aspect the present invention relates to a method in relation to a safety system for a working vehicle comprising a working equipment, e.g. a crane or a working tool, the safety system comprises a control unit, a controller, e.g. a remote controller, configured to control said working equipment, and a display unit.

The method comprises:
  defining a set of three-dimensional safety spaces in relation to the vehicle, wherein each safety space is defined by a data representation of boundaries of the safety space,
  presenting at least one safety space from said set of safety spaces on said display unit, wherein said at least one safety space being presented overlaid on an image of at least a part of the working vehicle and working equipment, and wherein each presented safety space being presented in a predefined position, defined by space position parameters, in relation to the working vehicle and working equipment, receiving a first input signal comprising space position parameters representing at least one chosen safety space among the presented safety spaces, and designating each at least one chosen safety space as an active safety space, and receiving a second input signal comprising a safety space state command either allowing or preventing said working equipment to be moved into said at least one active safety space, and applying a state command signal to said controller that in turn controls said working equipment in dependence of said safety space state command.

The safety system and also the method in relation to the system according to the present invention improves the safety and user-friendliness when working with a working equipment by presenting available safety spaces to an operator that may choose and adapt a safety space to a particular situation.

DETAILED DESCRIPTION

The safety system will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
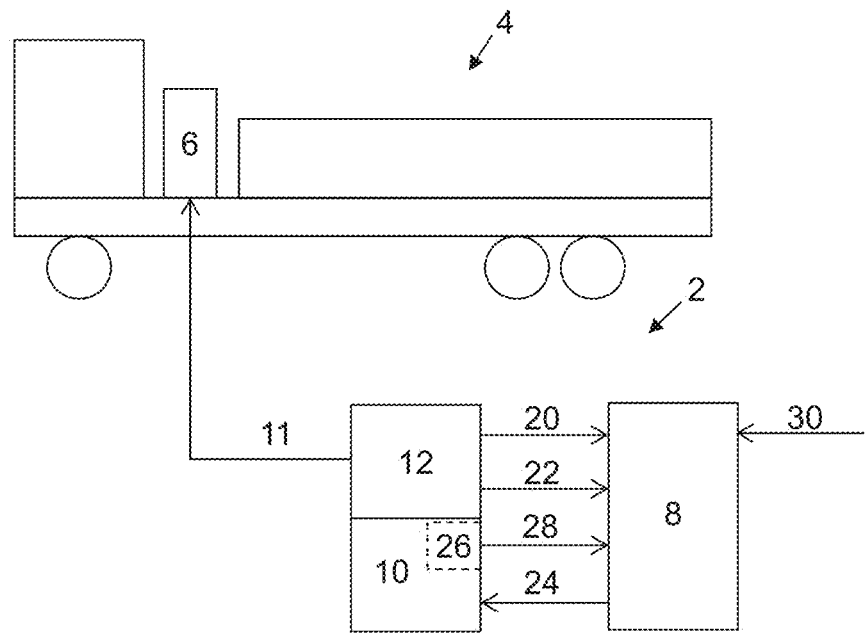
FIG. 1 is a schematic illustration of a safety system according to the present invention.
Figure 2:
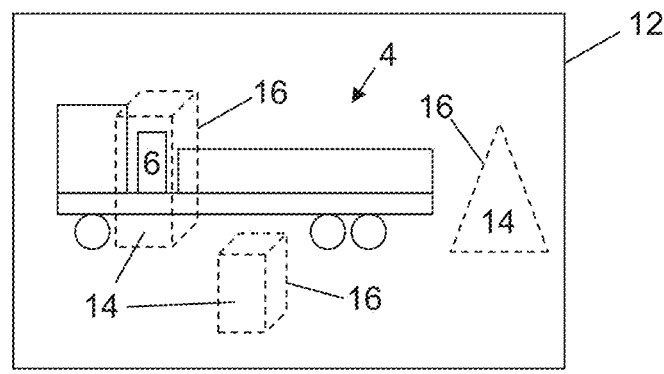
FIG. 2 is a schematic illustration of a display unit according to an embodiment of the present invention.

First with references to FIGS. 1-3 a safety system 2 for a working vehicle 4 comprising a working equipment 6, e.g. a crane or a working tool, will be described in detail. The working vehicle may e.g. be a cargo vehicle provided with a crane, a working vehicle provided with a crane having a rotator arranged at the crane tip, or any other vehicle provided with any type of working equipment.

The safety system 2 comprises a control unit 8, a controller 10, e.g. a remote controller, configured to control the working equipment 6 by a control signal 11, and a display unit 12. The display unit may be an integrated part of the controller. The control unit is provided with a necessary processing capability in order to perform all processing and calculations required herein, and may be a separate unit arranged within the vehicle or a unit being an integrated part of the vehicle's other control units.

The control unit is configured to define a set of three-dimensional safety spaces 14 (see FIG. 2) in relation to the vehicle 4, wherein each safety space 14 is defined by a data representation of boundaries 16 of the safety space 14.

The data representation of the boundaries of the set of three-dimensional safety spaces may e.g. be stored in a memory unit of the control unit. A 3D safety space may be regarded as a virtual 3D safety cage having delimitation surfaces between the boundaries.

The control unit is further configured to present at least one safety space 14 from the set of safety spaces on the display unit 12, wherein the at least one safety space being presented overlaid on an image 18 of at least a part of the working vehicle 4 and working equipment 6. The image 18 may be obtained by one or many cameras arranged at the vehicle and/or working equipment, or may be schematic images of the vehicle and working equipment.

Each presented safety space being presented in a predefined position, defined by space position parameters, in relation to the working vehicle and working equipment.

An operator of the vehicle may then determine one or many of the safety spaces presented at the display unit to be chosen. This may be performed by touching the chosen safety space if the display unit is a touch screen, or by selecting the safety space by moving a cursor on the screen and mark the chosen safety space(s).

Figure 3:
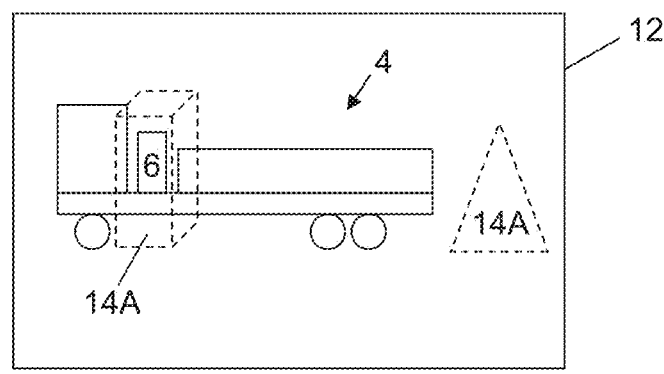
FIG. 3 is a schematic illustration of a display unit according to an embodiment of the present invention.

When one or many safety spaces have been chosen a first input signal 20 is generated and the control unit 8 is configured to receive the first input signal 20 comprising space position parameters representing at least one chosen safety space among the presented safety spaces, and to designate each at least one chosen safety space as an active safety space 14A (see FIG. 3).

In addition the control unit is configured to receive a second input signal 22 comprising a safety space state command either allowing or preventing the working equipment to be moved into the at least one active safety space 14A.

This second input signal may be manually generated by the operator via the controller. As an alternative, the signal may be automatically generated to be a state ("allow" or "prevent") set when initiating the system.

The control unit 8 is then configured to apply a state command signal 24 to the controller 10 that in turn is configured to control the working equipment 6 in dependence of the safety space state command by applying the control signal 11 to the working equipment 6, i.e. such that the working equipment is prevented or allowed to move into the active safety space(s).

Often a safety space, preferably set up for preventing the working equipment from moving into the safety space, is determined to a location where the operator stands, and often the operator controls the working equipment by a controller, preferably a remote controller. Thus, according to one embodiment, one of the safety spaces 14 in the set of safety spaces is determined to be a space around the controller 10. In this case the size of the safety space is such that the operator is safely within the safety space. In one example the safety space being e.g. a circular cylinder around the operator having a radius of 1 m. and a height of 2.5 m. In order to determine the position of the controller 10, it comprises a positioning member 26, e.g. working according to the Global Positioning System (GPS) technology, configured to determine the position of the controller and to generate a positioning signal 28 to the control unit, and that the safety space 14 is determined, by the control unit 8, in dependence of the determined position of the controller.

In a further embodiment the control unit 8 is configured to disable the controller 10 when the controller is not in an active safety space. By disabling the controller no control of the working equipment may be performed by the controller.

This may be performed directly, or after a specified delay, or after a warning has been generated to the operator to notify the operator that the controller will be disabled. This embodiment is advantageous if the operators move when controlling the working equipment. In a related embodiment the control unit 8 is configured to enable the controller 10 when the controller is detected to be in an active safety space.

Figure 4:
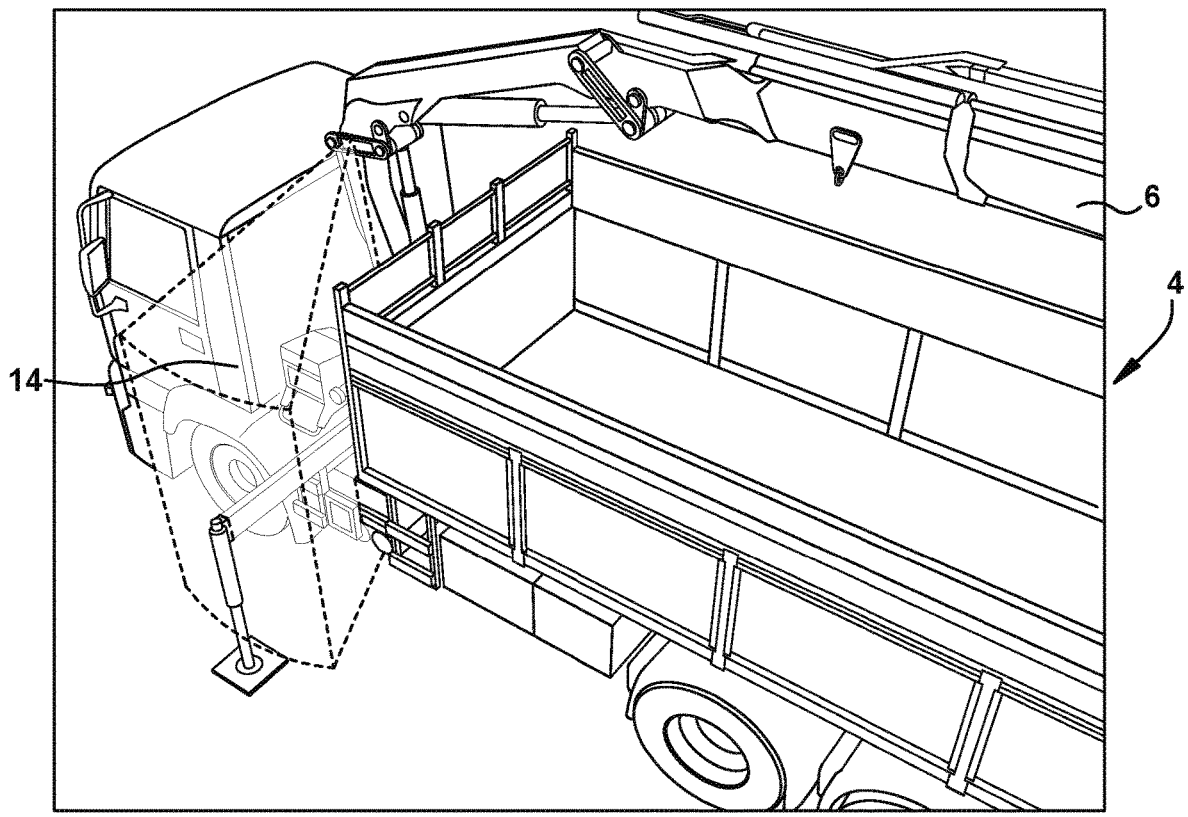
FIG. 4 is a perspective view illustrating an embodiment of the present invention.

In FIG. 3 is illustrated the display unit presenting an image of the working vehicle and the working equipment 6, illustrating an embodiment where the control unit is configured to present the at least one active safety space 14A in the determined position(s) on said display unit 12, and to stop presenting the not chosen safety space(s). In FIG. 3 two active safety spaces 14A are shown. One around the working equipment 6, and one where an operator may be located. In FIG. 4 is illustrated an example where safety spaces 14 are presented overlaid on an image of the vehicle in relation to support legs of the vehicle.

The set of safety spaces may be predefined and determined to be in predefined positions in relation to the vehicle, working equipment, and controller.

Figure 5:
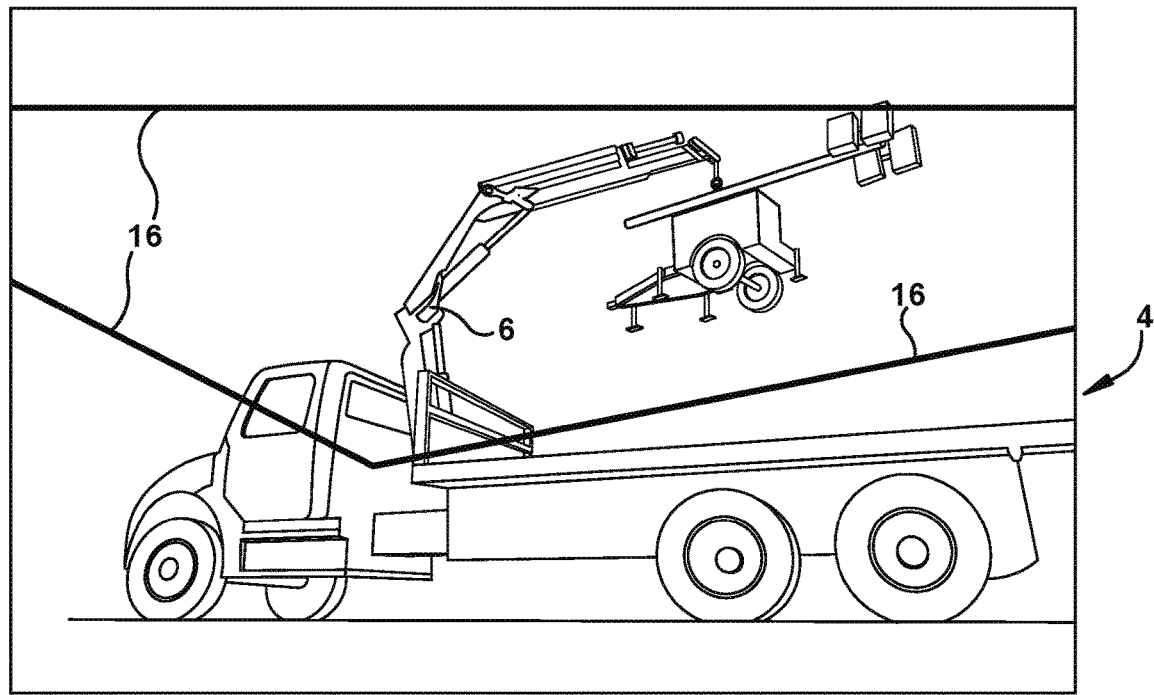
FIG. 5 is a perspective view illustrating another embodiment of the present invention.

In a further embodiment the boundaries 16 of the safety spaces may be defined by the operator, e.g. in dependence of the location of the vehicle where obstacles, e.g. bridges, may set limits for the movements of the working equipment. Such a situation is illustrated in FIG. 5 where boundaries 16 to the safety space is set by an operator in relation to the environment, in this example a bridge. In this example the safety state command is "allow", i.e. the working equipment 6 is allowed to move within the safety space, but not outside.

Thus, the control unit 8 is configured to receive boundary signals 30 representing positions of the boundaries 16 of a safety space 14, wherein the boundary signals 30 are obtained during a safety space set-up procedure, and obtained when defining a set of three-dimensional safety spaces 14.

In one example the operator may move a safety space presented at the display, being a touch screen, by choosing (touching) and dragging the presented safety space to a desired location, e.g. a location that is safe to stand when controlling the working equipment. It may then also be possible to the change size of a presented safety space, e.g. by using two fingers and increasing or decreasing the distance between the finger tips touching the screen.

In a further embodiment the boundary signals 28 are generated during movement of the working equipment 6 and in dependence of positions of the working equipment. This is achieved by moving the working equipment, e.g. the crane, such that the crane tip is moved to various positions that are registered and then stored and applied as boundaries for safety spaces.

The present invention also relates to a method in relation to a safety system 2 for a working vehicle 4 comprising a working equipment 6, e.g. a crane or a working tool. The safety system 2 has been described in detail above and it is herein referred to that description. Thus, the safety system comprises a control unit 8, a controller 10, e.g. a remote controller, configured to control the working equipment 6, and a display unit 12.

Figure 6:
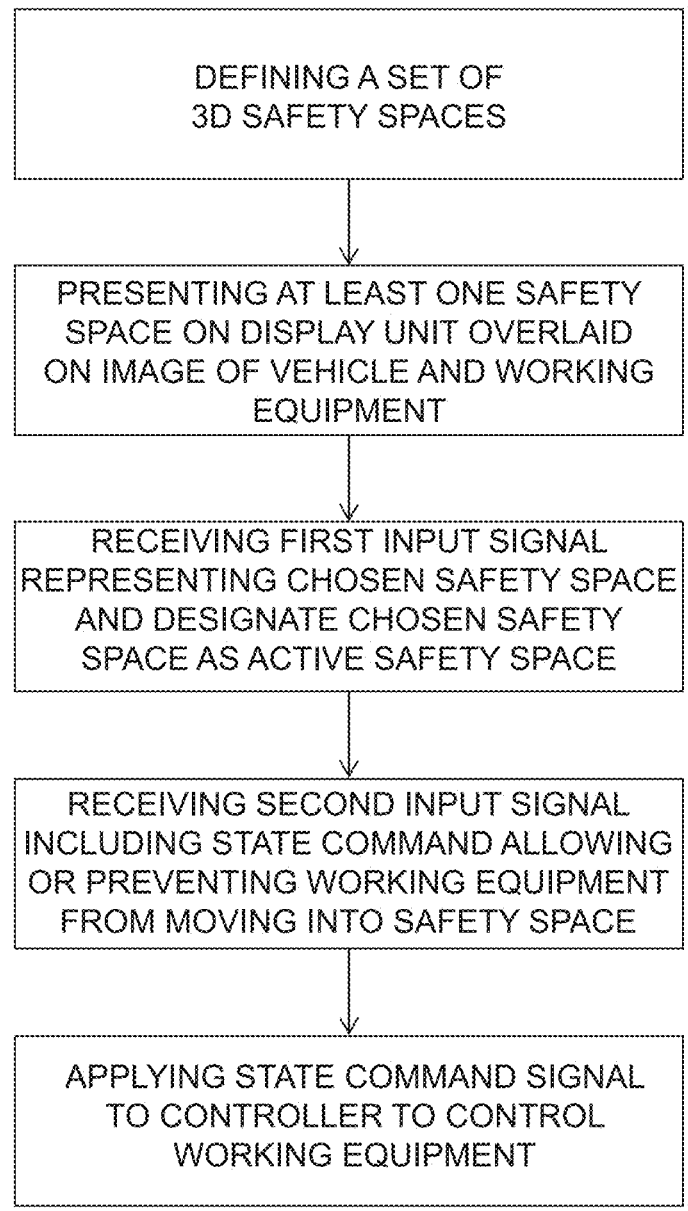
FIG. 6 is a flow diagram illustrating the method according to the present invention.

The method will now be described in detail with references to the flow diagram shown in FIG. 6. The method comprises the steps of:

Defining a set of three-dimensional safety spaces 14 in relation to the vehicle 4, wherein each safety space 14 is defined by a data representation of boundaries 16 of the safety space.

Presenting at least one safety space 14 from said set of safety spaces on said display unit 12, wherein said at least one safety space being presented overlaid on an image 18 of at least a part of the working vehicle 4 and working equipment 6, and wherein each presented safety space being presented in a position, defined by space position parameters, in relation to the working vehicle and working equipment.

Receiving a first input signal 20 comprising space position parameters representing at least one chosen safety space among the presented safety spaces, and designating each at least one chosen safety space as an active safety space 14A.

Receiving a second input signal 22 comprising a safety space state command either allowing or preventing said working equipment to be moved into said at least one active safety space 14A, and applying a state command signal 24 to said controller 10 that in turn controls said working equipment 6 in dependence of said safety space state command.

In one embodiment the method comprises defining one of the safety spaces 14 in said set of safety spaces around the controller 10.

In a further embodiment the method comprises disabling the controller 10 when the controller is not in an active safety space, and enabling the controller 10 when the controller is in an active safety space.

Preferably, the method comprises presenting the at least one active safety space 14A in the determined position(s) on the display unit 12, and to stop presenting the not chosen safety space(s).

Sometimes it is beneficial for an operator to freely define the safety space, e.g. in relation to the environment. The method then comprises receiving boundary signals 30, e.g. generated by the operator, representing positions of the boundaries 16 of a safety space 14, and that the boundary signals 30 are obtained during a safety space set-up procedure, and obtained when defining a set of three-dimensional safety spaces 14.

In one embodiment the method comprises generating the boundary signals 30 when moving the working equipment 6 to various positions in order to define the boundaries of the safety space, e.g. by detecting the positions of a working equipment, e.g. of a crane tip. Thereby, the boundaries of the safety spaces may be easily adapted to a specific environment.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A safety system for a working vehicle comprising a working equipment, the safety system comprises a control unit, a remote controller configured to control said working equipment, the remote controller including a display unit, wherein said control unit is configured to:
   define a set of three-dimensional safety spaces in relation to the vehicle, wherein each safety space is defined by a data representation of boundaries of the safety space,
   present at least one safety space from said set of safety spaces on said display unit, wherein said at least one safety space being presented overlaid on an image of at least a part of the working vehicle and working equipment, and wherein each presented safety space being presented in a position, defined by space position parameters, in relation to the working vehicle and working equipment, wherein the remote controller is configured to enable choosing of one or more of presented safety spaces by an operator, the control unit further being configured to:

receive a first input signal from the remote controller, the first input signal comprising space position parameters representing at least one chosen safety space among the presented safety spaces on the display unit of the remote controller, and to designate each at least one chosen safety space as an active safety space, and to receive a second input signal comprising a safety space state command either allowing or preventing said working equipment to be moved into said at least one active safety space, and to apply a state command signal to said remote controller that in turn is configured to control said working equipment in dependence of said safety space state command;

wherein one of said safety spaces in said set of safety spaces surrounds said remote controller;

wherein said remote controller comprises a positioning member configured to determine the position of said remote controller and to generate a positioning signal to the control unit, and that said safety space is determined, by said control unit, in dependence of said determined position of said remote controller.

2. The safety system according to claim 1, wherein said control unit is configured to disable said remote controller when said remote controller is not in an active safety space.

3. The safety system according to claim 1, wherein said control unit is configured to enable said remote controller when said remote controller is in an active safety space.

4. A safety system according to claim 1, wherein the control unit is further configured to present the at least one active safety space in said determined position(s) on said display unit, and to stop presenting the not chosen safety space(s).

5. The safety system according to claim 1, wherein said control unit is configured to receive boundary signals representing positions of the boundaries of a safety space, wherein said boundary signals are obtained during a safety space set-up procedure, and obtained when defining a set of three-dimensional safety spaces.

6. The safety system according claim 5, wherein said boundary signals are generated during movement of said working equipment and in dependence of positions of said working equipment.

7. The method according to claim 1, comprising receiving boundary signals representing positions of the boundaries of a safety space, wherein said boundary signals are obtained during a safety space set-up procedure, and obtained when defining a set of three-dimensional safety spaces.

8. The method according to claim 7, comprising generating said boundary signals during movement of said working equipment and in dependence of positions of said working equipment.

9. The safety system according to claim 1, wherein the working equipment comprises one or more of a crane or a working tool.

10. A method in relation to a safety system for a working vehicle comprising a working equipment, the safety system comprises a control unit, a remote controller configured to control said working equipment, the remote controller including a display unit, wherein said method comprises:

defining a set of three-dimensional safety spaces in relation to the vehicle, wherein each safety space is defined by a data representation of boundaries of the safety space, presenting at least one safety space from said set of safety spaces on said display unit, wherein said at least one safety space being presented overlaid on an image of at least a part of the working vehicle and working equipment, and wherein each presented safety space being presented in a position, defined by space position parameters, in relation to the working vehicle and working equipment, wherein the remote controller is configured to enable choosing of one or more of presented safety spaces by an operator, said method further comprising:

receiving a first input signal from the remote controller, the first input signal comprising space position parameters representing at least one chosen safety space among the presented safety spaces on the display unit of the remote controller, and designating each at least one chosen safety space as an active safety space, and receiving a second input signal comprising a safety space state command either allowing or preventing said working equipment to be moved into said at least one active safety space, and applying a state command signal to said remote controller that in turn controls said working equipment in dependence of said safety space state command;

defining one of said safety spaces in said set of safety spaces surrounds said remote controller;

determining, by a positioning member of the remote controller, the position of said remote controller and generating, by the positioning member, a positioning signal to the control unit, and determining, by said control unit, that said safety space in dependence of said determined position of said remote controller.

11. The method according to claim 10, comprising disabling said remote controller when said remote controller is not in an active safety space, and enabling said remote controller when said remote controller is in an active safety space.

12. The method according to claim 10, comprising presenting the at least one active safety space in said determined position(s) on said display unit, and to stop presenting the not chosen safety space(s).

13. The method according to claim 10, wherein the working equipment comprises one or more of a crane or a working tool.

* * * * *